(12) United States Patent
Smith

(10) Patent No.: US 8,732,652 B2
(45) Date of Patent: *May 20, 2014

(54) SYSTEM AND METHOD FOR CREATING MULTI-MODE APPLICATIONS

(75) Inventor: Christopher Smith, Burlington (CA)

(73) Assignee: Blackberry Limited, Waterloo (CA)

( * ) Notice: Subject to any disclaimer, the term of this patent is extended or adjusted under 35 U.S.C. 154(b) by 1185 days.

This patent is subject to a terminal disclaimer.

(21) Appl. No.: 11/763,526

(22) Filed: Jun. 15, 2007

(65) Prior Publication Data

US 2008/0313594 A1  Dec. 18, 2008

(51) Int. Cl.
*G06F 9/44* (2006.01)
*G06F 15/177* (2006.01)

(52) U.S. Cl.
USPC ............................ 717/100; 717/121; 709/220

(58) Field of Classification Search
USPC .................................................. 717/121, 100
See application file for complete search history.

(56) References Cited

U.S. PATENT DOCUMENTS

| | | | |
|---|---|---|---|
| 7,116,645 B2 * | 10/2006 | Morvan et al. | 370/278 |
| 7,302,256 B1 * | 11/2007 | O'Hara et al. | 455/418 |
| 7,440,459 B2 * | 10/2008 | Casati | 370/395.5 |
| 7,613,132 B2 * | 11/2009 | Tripathi et al. | 370/255 |
| 2004/0131078 A1 | 7/2004 | Gupta et al. | |
| 2004/0203945 A1 * | 10/2004 | Qu et al. | 455/466 |
| 2004/0204048 A1 * | 10/2004 | Lamensdorf | 455/556.1 |
| 2007/0111740 A1 * | 5/2007 | Wandel | 455/513 |
| 2007/0118585 A1 * | 5/2007 | Inoue et al. | 709/200 |
| 2007/0130333 A1 * | 6/2007 | Bhalla et al. | 709/224 |
| 2008/0147827 A1 * | 6/2008 | Morris | 709/220 |

FOREIGN PATENT DOCUMENTS

| | | |
|---|---|---|
| EP | 772994 A1 | 4/2007 |
| EP | 1772994 A1 * | 4/2007 |
| WO | 0156251 A2 | 8/2001 |

OTHER PUBLICATIONS

Extended European Search Report issued by the European Patent Office dated Jan. 4, 2008 for corresponding European Patent Application No. 07110422.8.
Examination Report issued by the European Patent Office dated May 29, 2009 for corresponding European Patent Application No. 07 110 422.8.
Canadian Office Action dated Feb. 9, 2011 for corresponding Canadian Patent Application No. 2,635,173 filed Jun. 16, 2008.
Canadian Office Action dated Sep. 27, 2012 for corresponding Canadian Patent Application No. 2,635,173 filed Jun. 16, 2008.

* cited by examiner

*Primary Examiner* — Ryan Coyer
(74) *Attorney, Agent, or Firm* — Gowling Lafleur Henderson LLP

(57) ABSTRACT

Multi-mode wireless communication devices capable of wLAN and WAN wireless network communication modes can be configured to communicate for backend services (e.g. Web Services, database, events) via a network gateway to operate in response to available modes. For example, for some activities (e.g. notification messages), the devices may be configured to communication in any available mode (WAN or wLAN) while for other activities (e.g. high bandwidth communications), the devices may be restricted to one mode only (e.g. wLAN). Component applications for execution by the devices can specify message delivery properties to indicate the mode(s) that may used for a particular message. A programming tool and method are described for configuring such component applications to specify mode delivery properties and to be responsive to mode information generated by a runtime environment generating, executing and supporting the component applications.

18 Claims, 5 Drawing Sheets

SYSTEM AND METHOD FOR CREATING MULTI-MODE APPLICATIONS

FIELD

The present invention relates generally to a system and method for developing applications and specifically to a system and method for developing applications to perform in multiple modes of wireless and/or wired communication.

BACKGROUND

Due to the proliferation of wireless networks, there are a continually increasing number of wireless devices in use today. These devices include mobile telephones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries.

Such software applications take advantage of the ability to transmit data of the wireless network in order to provide timely and useful services to users, often in addition to voice communication. However, due to a plethora of different types of devices and modes of wireless communication, the restricted resources of some devices and/or communication modes, and the complexity of delivering large amounts of data to the devices, developing software applications remains a difficult and time-consuming task.

With the advent of multi-mode devices (for example, devices that combine wireless local area networks (e.g. technologies under the Wi-Fi or WiMAX brands) and wireless wide area networks (e.g. cellular technologies like GSM/GPRS/EDGE) applications can have the ability to offer different usage models depending on the mode of wireless operation selected. There are two problems application developers may wish to consider when developing applications for multi-mode devices that they would not consider for single-mode devices: (i) application behaviour may need to be constant regardless of the mode of wireless operation and (ii) application behaviour may be tailored based on the current mode of operation. It is suggested that the first problem may be addressed by lower-level interfaces and therefore be transparent at the application layer. Therefore what is desired is a solution to assist developers of wireless applications to define applications for multi-mode operation that tailors behaviour in response to the current mode of operation.

Systems and methods have been created for developing component-based applications for executing on a computing device, often a wireless communication device. More details regarding component application can be found in Patent Cooperation Treaty Application Numbers PCT/CA2003/001976 entitled, "System and Method for Building and Execution of Platform-Neutral Generic Services Client Applications" and published as WO2004059938; PCT/CA2003/001980 entitled, "System and Method of Building Wireless Component Applications" and published as WO2004059957; and PCT/CA2003/001981 entitled, "System and Method of Creating and Communicating with Component Based Wireless Applications" and published as WO2004059939, each of which is assigned to the owner of the present application and herein incorporated by reference.

Generally speaking, an integrated development environment (IDE) is provided to assist developers to efficiently develop such component-based applications. Thus, it is further desired to provide a solution to assist developers of wireless applications to define applications for multi-mode operation that takes advantage of existing programming tools.

BRIEF DESCRIPTION OF THE DRAWINGS

An embodiment of the invention will now be described by way of example only with reference to the following drawings in which.

DETAILED DESCRIPTION

Multi-mode communication devices capable of at least two modes of communication, whether wireless modes such as wLAN and WAN wireless network communication modes, short range wireless modes such as Bluetooth™ (Bluetooth™ is a registered trademark of Bluetooth SIG, Inc.) and wired modes such as LAN and WAN network communication modes can be configured to communicate for backend services (e.g. Web Services, database, events) via a network gateway to operate in response to available modes. For example, for some activities (e.g. notification messages), the devices may be configured to communicate in any available wired or wireless mode (WAN or wLAN) while for other activities (e.g. high bandwidth communications), the devices may be restricted to certain modes only (e.g. wLAN or wired modes). Component applications for execution by the devices can specify message delivery properties to indicate the mode(s) to may used for a particular message. Runtime mode information may be provided and maintained automatically by a communications subsystem interface for determining mode availability. A programming tool and gateway are also described.

Figure 1:
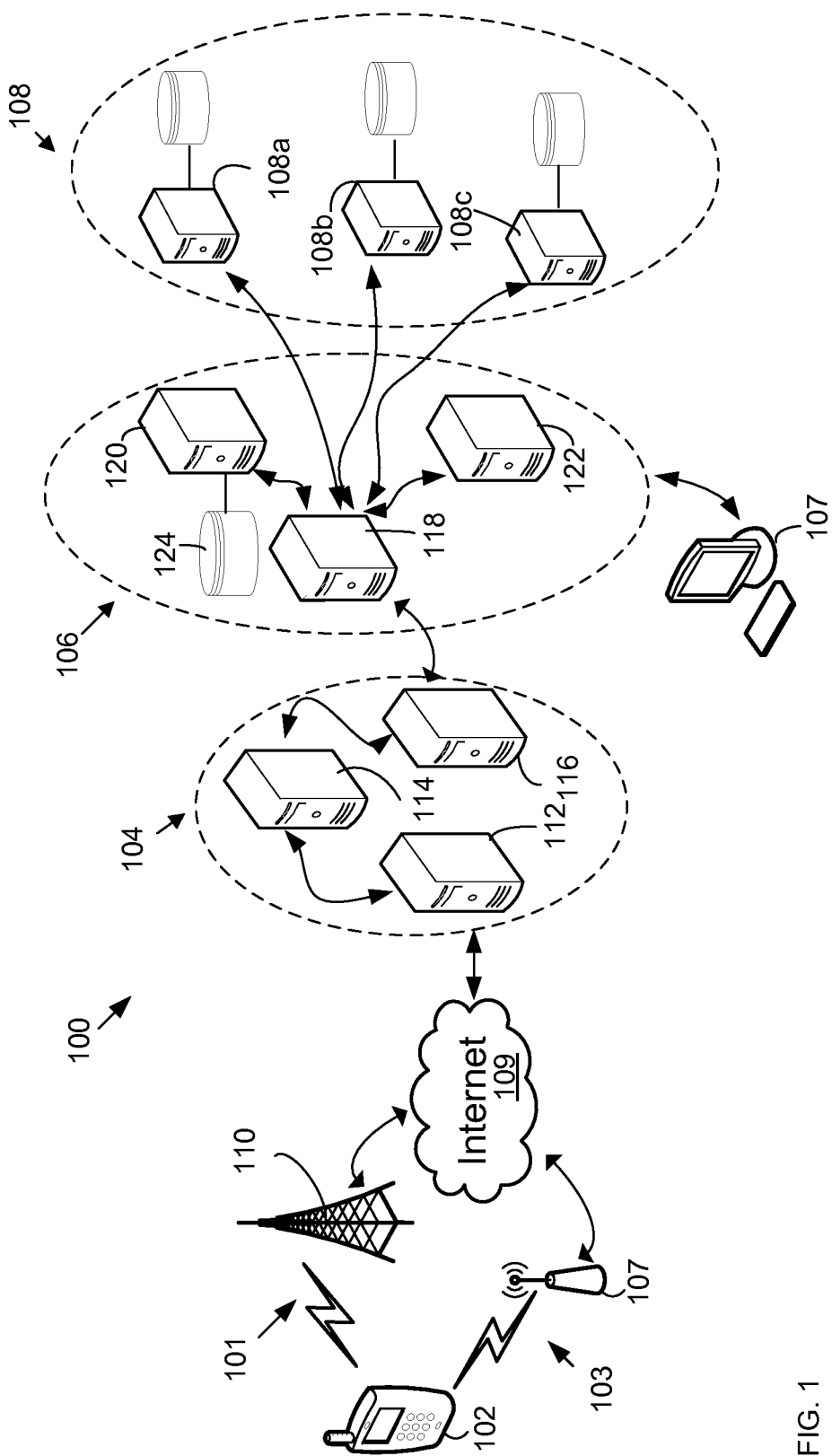
FIG. 1 is a block diagram of a communication network infrastructure.

For convenience, like numerals in the description refer to like structures in the drawings. Referring to FIG. 1, a communication infrastructure is illustrated generally by numeral 100. The communication infrastructure 100 comprises a mobile wireless communication device 102, or simply mobile device 102, multiple wireless communication networks 101 and 103, wireless device network infrastructure 104, an application gateway 106, an application development environment 107 and a plurality of backend servers 108. For simplicity, the drawings and description refer to a single mobile wireless communication device 102 whereas in practice and as would be understood to a person of ordinary skill, a plurality of such devices are typically present in the infrastructure 100.

A particular mobile device 102 may comprise various computing devices such as a desktop computer, a laptop or other portable computer, a smart phone, a personal digital assistant (PDA), and the like. In FIG. 1 device 102 is in communication with the application gateway 106 via at least one of the first and second wireless communication networks 101 and 103 each of which are coupled for communication to wireless device network infrastructure 104. Though shown only coupled via wireless communication networks, device 102 may be capable of coupling via a wired network such as via a LAN having a WAN gateway well known to persons of ordinary skill in the art. For example, a device 102 that is a mobile device may be coupled via a serial connection (e.g. USB) to a PC or laptop (not shown) that is coupled to the LAN.

In the present embodiment, first wireless communication network 101 comprises a cellular telephone network (represented by tower 110) for data communication between the device 102 and the wireless device network infrastructure 104 through the Internet 109. Second wireless communication network 103 comprises a Wi-FI or WiMAX communication network (represented by wireless access point 107) for data communication between the device 102 and the wireless device network infrastructure 104 through the Internet 109. As such, device 102 may communicate in two different wireless modes. As mention, device 102 may also communicate in a wired mode.

The wireless device network infrastructure 104 may include several components such as a relay 112, a corporate server 114 and/or a mobile data server (MDS) 116 for, among other things, relaying data between the device 102 and the application gateway 106. As will described further, the mobile device 102 and MDS 116 can be configured to determine and operate in response to a mode of wireless communication (i.e. which one of network 101 and 103) being used by an application on the device 102.

The application gateway 106 comprises a gateway server 118 a provisioning server 120, a discovery server 122 and a repository 124. The gateway server 118 is in communication with both the provisioning server 120 and the discovery server 122. The gateway server 118 is further in communication with a plurality of the backend servers (collectively 108), such as Web services 108a, database services 108b, as well as other event source services 108c, via a suitable link (e.g. a public network like Internet 109 or a private network). For example, the gateway server 110 is connected with the Web services 108a and database services 108b via Simple Object Access Protocol (SOAP) and Java Database Connectivity (JDBC) respectively. Other types of backend servers 108 and their corresponding connectors and links will be apparent to a person of ordinary skill in the art. Accordingly, it can be seen that the gateway server 118 acts as a message broker between the device 102 and the backend servers 108. By way of example, a web service may provide media content (e.g. music or other audio, video, etc.) for downloading to the mobile device 102. The service may provide notifications of new content and an interface to obtain same. Notifications may be relatively light in their communication requirements while content downloading is relatively heavy (higher bandwidth and costs). A database service may have similar requirements when exchanging large amounts of data with the device 102.

Though infrastructure 104 and application gateway 106 are illustrated as distinct components with discreet constituent servers, other arrangements will be understood to a person of ordinary skill in the art. For example, MDS 116 and gateway server 118 may be provisioned on one server.

Services of MDS 116 may include:
Administrative and Management Service dealing with policies, such as those specifying allowed applications for users, services available to applications and more;
Provisioning Service controlling and managing which applications users can download to a mobile devices;
Data Optimization Service transforming data for efficient wireless transmission and use on mobile devices;
Connection Service providing TCP/IP and HTTP-based connectivity between the device and other applications e.g. for browsing;
Application Integration Service supporting the integration of and data transmission between device applications, as described further below, and backend servers 108; and
MDS Application Repository centrally managing published device and MDS applications as described below.

Wireless device 102 is initially provisioned with a service book establishing various protocols and settings, including connectivity information for the corporate server 114 and/or the mobile data server 116. These parameters may include a Uniform Resource Locator (URL) for the MDS 116 and/or application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Mobile device-side applications for communicating with backend servers 108 via gateway 106 are provided for execution by the device. The applications are stored in the repository 124 as a series of packages, or bundles. The packages are typically created by an application developer using a design tool provided by the application development environment 107. The design tool (FIGS. 3 and 4) provides support for a drag-and-drop graphical approach for visual design of application components. Components may include screens, data elements, messages and application workflow logic, as further described below.

The application packages are represented as structured data (e.g. eXtensible Markup Language (XML) documents) that can be generated automatically by the design tool through an automatic code generation process. The design tool further enables the automatically-generated code to include, or be otherwise augmented by, an industry standard scripting language, such as JavaScript or another scripting/programming language known in the art.

The availability of application packages in the repository 124 is published in a registry via a discovery service provided by the discovery server 122. It is recognized that there can be more than one repository 124 and associated registries used by the gateway server 118.

Figure 2:
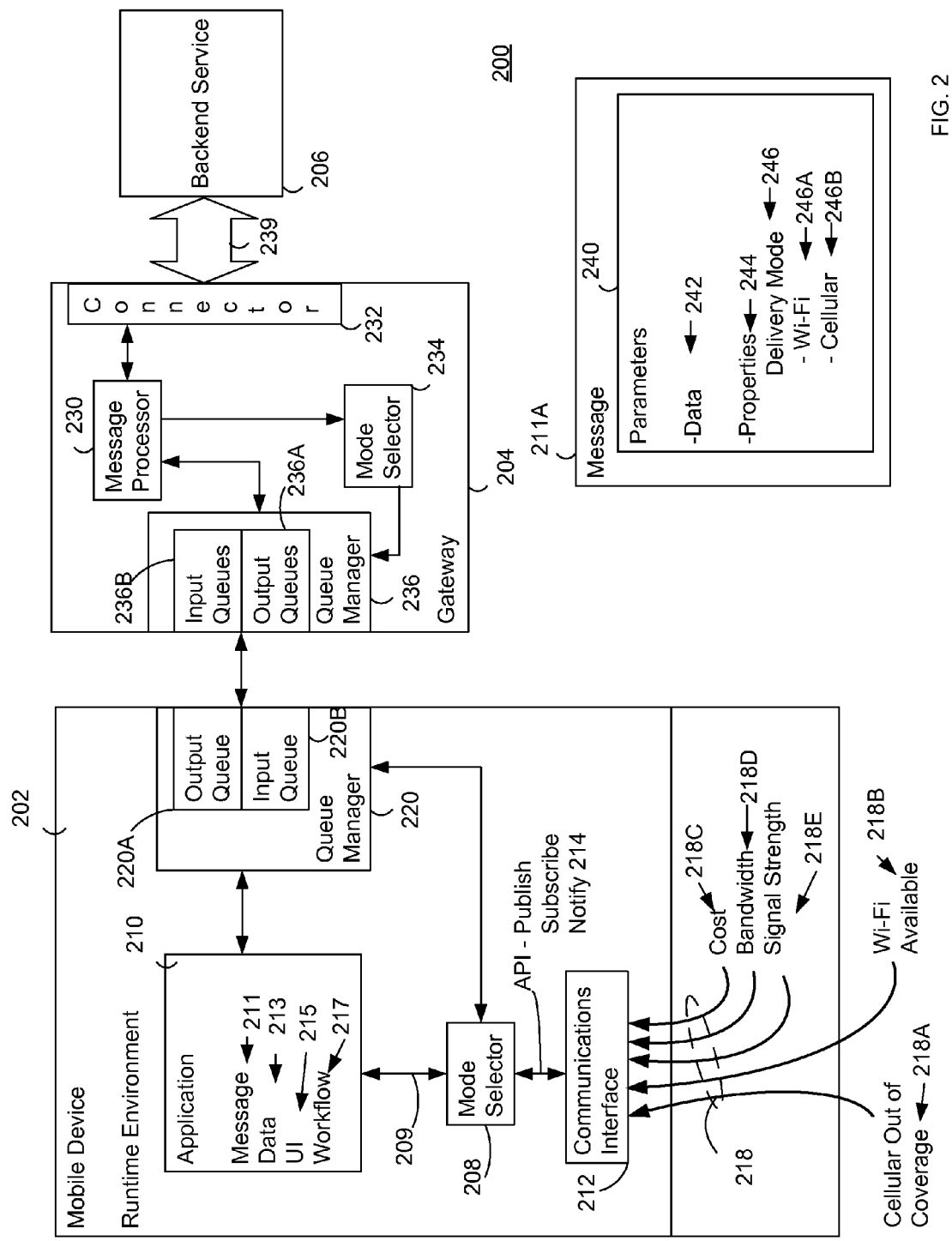
FIG. 2 is a block diagram of multi-mode operations and a representative multi-mode message for communication network infrastructure of FIG. 1.

With the advent of dual-mode and multi-mode devices combining communication technologies, applications can be developed and operated to provide different usage models that may vary depending on the mode of operation that is available at runtime. FIG. 2 illustrates, in accordance with an embodiment thereof, an operational view 200 of a multi-mode wireless application including a representative message for use with infrastructure 100 of FIG. 1.

Operational view 200 shows a mobile device (e.g. 102) with a runtime environment 202 providing an execution environment to a device-side multi-mode application 210 (hereinafter "device application 210"). Device application 210 is configured to communicate with an MDS/Application Gateway 204. MDS/Application Gateway 204 couples the device application 210 to receive the backend services 206 of a server (e.g. 108a, 108b or 108c) comprising messages and data 239 through a suitable connector 232 such as a JDBC connector for database services, a SOAP-based connector for Web Services, etc. in accordance with the type of backend services 206 to be provided. For clarity, MDS 116 and application gateway 118 are illustrated as gateway 204.

Runtime environment 202 is preferably capable of generating, hosting and executing device applications, such as device application 210, which are in the form of component applications described further herein below. Other functions of runtime environment 202 can include, such as, but not limited to, support for language, coordinating memory allocation, networking, management of data during I/O operations, coordinating graphics on an output device of the devices 102 and providing access to core object-oriented classes and supporting files/libraries. Examples of runtime environments 202 can include Common Language Runtime (CLR) by Microsoft and Java Runtime Environment (JRE) by Sun Microsystems.

Runtime environment 202 preferably supports the following functions for the resident executable versions of the device applications (e.g. 210), such as but not limited to: a communications capability to communicate messages (e.g. 211A) for backend services 206; data input capabilities for a user of the device 102 for example to supply data parts for outgoing messages; presentation or output capabilities for response messages (incoming messages) or notifications of the backend service 206 on an output device (not shown) of device 102; data storage services to maintain local client data in a memory module (not shown) of the device 102; and execution environment capabilities for a scripting language for coordinating operation of the application components 211, 213, 215 and 217 of the device application 210.

Device application 210 may be defined as a component application having components describing messages 211, data 213, presentation or user interface (UI) (e.g. screens) 215 and application workflow 215. Thus a message component 211 defines the format of messages used by the respective application to communicate with an external system such as between the device and MDS. Data components 213 described data entities used by messages and other components of the applications. A presentation or UI component 215 defines the appearance and behaviour of the device application 210 as it its displayed by the device's output interfaces (e.g. display screen, audio output, etc.) The UI components 215 can specify GUI screens and controls, and actions to be executed when the user interacts with the component application 210. For example, the UI components 215 may define screens, labels, edit boxes, buttons and menus, and actions to be taken when the user types in an edit box or pushes a button.

Workflow components 217 of a component application define processing that occurs when an action is to be performed, such as an action specified by a UI component 215 as described above, or an action to be performed when a message 211A arrives from the MDS or is sent by the device as applicable. Workflow components 217 may be written as a series of instructions in a programming language or a scripting language, such as but not limited to ECMAScript, and can be compiled into native code and executed by an application container (not shown) provided by the runtime environment 202 hosting the application 210. An example of a workflow component 217 may be to assign values to data, manipulate screens, or send a message. Workflow component 217 supports a correlation between the messages 222 and defines application flow as a set of rules for operations on the other components 211, 213 and 215. Multiple workflow components can be defined with respect to a given application 210. Such additional workflow components, similar to the multiple presentation components (not shown), can define differing work flows based upon different supported capabilities or features of particular devices 102. Alternative workflow components may be defined for single mode devices and multi-mode devices to take advantage of such capabilities.

A representative message component 211A is shown comprising message parameters 240 including data 242 (referencing which data is included in the message and defined in relation to data component definitions 213) and properties 244 for the message. Once such property may include delivery mode 246 to provide an indication of what mode or modes may be used to deliver the message. The delivery mode 246 may be specified in a variety of ways. When more than one mode may be used, the modes may be prioritized or ranked to indicated preferences. Some message may be restricted to specific modes only (e.g. to reduce bandwidth consumptions) By way of example, message 211A specifies that the delivery mode 246 may be one or both of Wi-Fi 246A and Cellular 246B indicating which of the wireless communication networks 101 and 103 may be used to communicate the message. Other message properties 244 may include a delivery reliability level (not shown), setting a message delivery level such as one of best effort, standard and reliable indicating levels of message ordering, processing and processing guarantees.

The operation of application 210 and gateway 204 may vary in accordance with the mode of communication between them. For example, when operating in a relatively low-bandwidth, high-cost mode of operation (e.g. GPRS cellular 101) messages and the data therein passed between the device application 210 and gateway 204 may be responsive to the mode in order to reduce cost and improve the end user experience. For example only specific operations and notifications may be sent between the server 116 and the device 102 while using this mode of operation. Alternatively while the device 102 is using a relatively high-bandwidth, low-cost mode of communication (Wi-Fi or WiMAX 103) more bandwidth intensive messages and data may be passed between the device 102 and the server 116 (for example, synchronization of database data, downloading of audio or video files, etc.).

Presentation screens, workflow and messages in particular may be responsive to mode characteristics and availability. For example, when operating in a high-bandwidth mode, users may be presented with screens to allow them to upload or download large amounts of data. Screen presentation component's may be responsive to a current mode of communicating. Certain operations may be prohibited in some modes or warnings generated. In other scenarios, screen presentations may be transparent to mode but workflow and message components may be configured to handle user instructions differently based on the mode. For example, messages may be queued for later delivery when a preferred mode becomes available. Workflow may transition between different screens depending on mode to present or not present certain functionality to a user. Data component 213 may include a definition for mode information as determined as described below.

To achieve multi-mode functionality, device applications 210 may determine which one or more modes of communication are available to the device 102. In accordance with the present embodiment, applications may receive mode information 209 from a mode selector component 208 that utilizes a publish/subscribe-style API 214 provided by the runtime environment 202 to a communications subsystem interface 212, for example. The API 214 allows a device application 210 via the mode selector to automatically query for mode information or subscribe for updates when the mode information changes during operation at runtime. Communications subsystem interface 212 may receive various wireless and wired communication characteristics (collectively 218) as inputs with which to determine the mode information. Communications subsystem interface 212 and mode selector 208 may be configured to provide various mode information such as whether a particular mode is or is not available or to determine and provide a preferred mode using such inputs 218 should two or more modes be available. However, determining a preferred mode may be left to application 210. Inputs 218 may include (but are not limited to) signals such as cellular out of coverage 218A, Wi-Fi available 218B, signal or related metrics like cost 218C, bandwidth 218D and signal strength 218E. These inputs 218 may be static parameters stored to the device or dynamic ones that are determined by the communications interface 212, an operating system or another application or service (all not shown) on device 102 at runtime.

Application 210 may communicate messages with the message properties (delivery mode) indicated via queue manager 220 that manages input queues 220A and output queues 220B. The queue manager can communicate the messages in accordance with the delivery mode property of the message and the available mode(s) from the mode selector. Output queue 220B may be managed to account for changes in mode, for example removing messages that cannot be transmitted when a mode is not (or no longer) available in accordance with timeout or other delivery mechanisms. Delivery notification (e.g. failure information) may be made available to application 210 e.g. via mode selector 220 or otherwise from the runtime environment. Though shown as communicating messages directly, queues 220A and 220B communicate via an appropriate communications subsystem for the applicable delivery mode.

Similarly on gateway 204, messages may be communicated via managed queues 236A and 236B and queue manager 236. Mode properties may be received in messages from the device for use by mode selector 234. Briefly and in simplified form, gateway 204 maintains connections to the device 102, in respective communication modes, and receives application messages (typically requests for backend services, among others) in input queues 236A. Message processor 230 processes the messages, mapping same in accordance with the protocols and requirements of the backend service 206, and sends the messages 239 via connector 232. gateway 204 also receives messages 239 from backend service 206 such as notifications or request responses. Message processor 230 processes these, mapping them to the requirements of the device 102 for receipt according to the device application's message component definitions 211. Additional messaging between device 102 and gateway 204 may include administrative messages such as for maintaining the application 210, requests for discovering and downloading component applications, etc. In accordance with a mode selector 234 receiving mode properties from the device 102, the messages are formatted for the device 102 and readied for output via output queues 238B accordingly.

The queues and in particular output queue 238B may comprise pointers to specific message content/data to be communicated to the device to avoid storing the content at the gateway 204 while waiting to communicate and therefore reducing storage costs at gateway 204. As well, manager 238 may manage the queues in accordance with timeout and other delivery mechanisms. Administrative limits may be placed on the queues such as for size and time (i.e. message life) on the server to reduce resource consumption.

Figure 3:
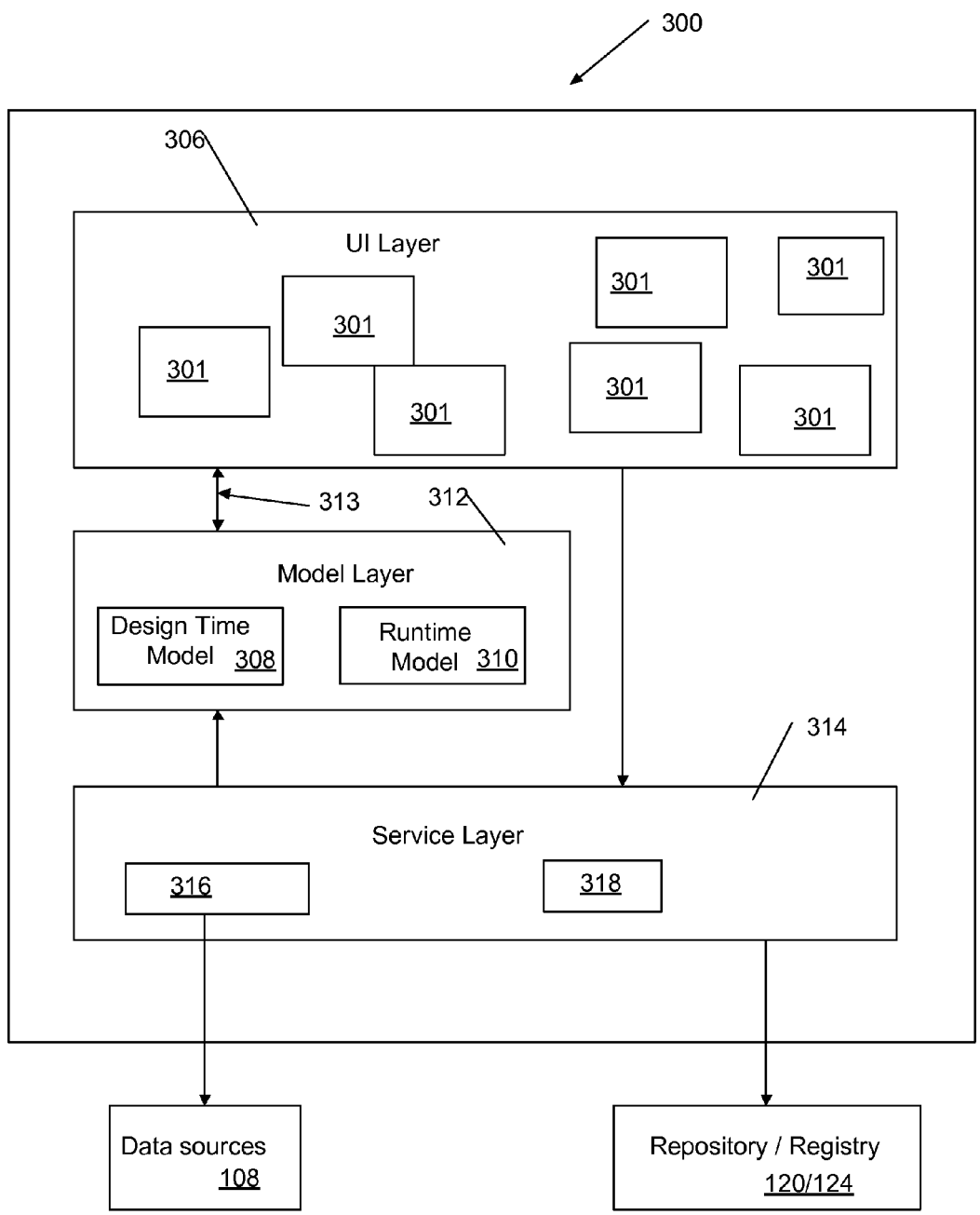
FIG. 3 is a block diagram illustrating a design tool architecture for programming multi-mode applications.
Figure 4:
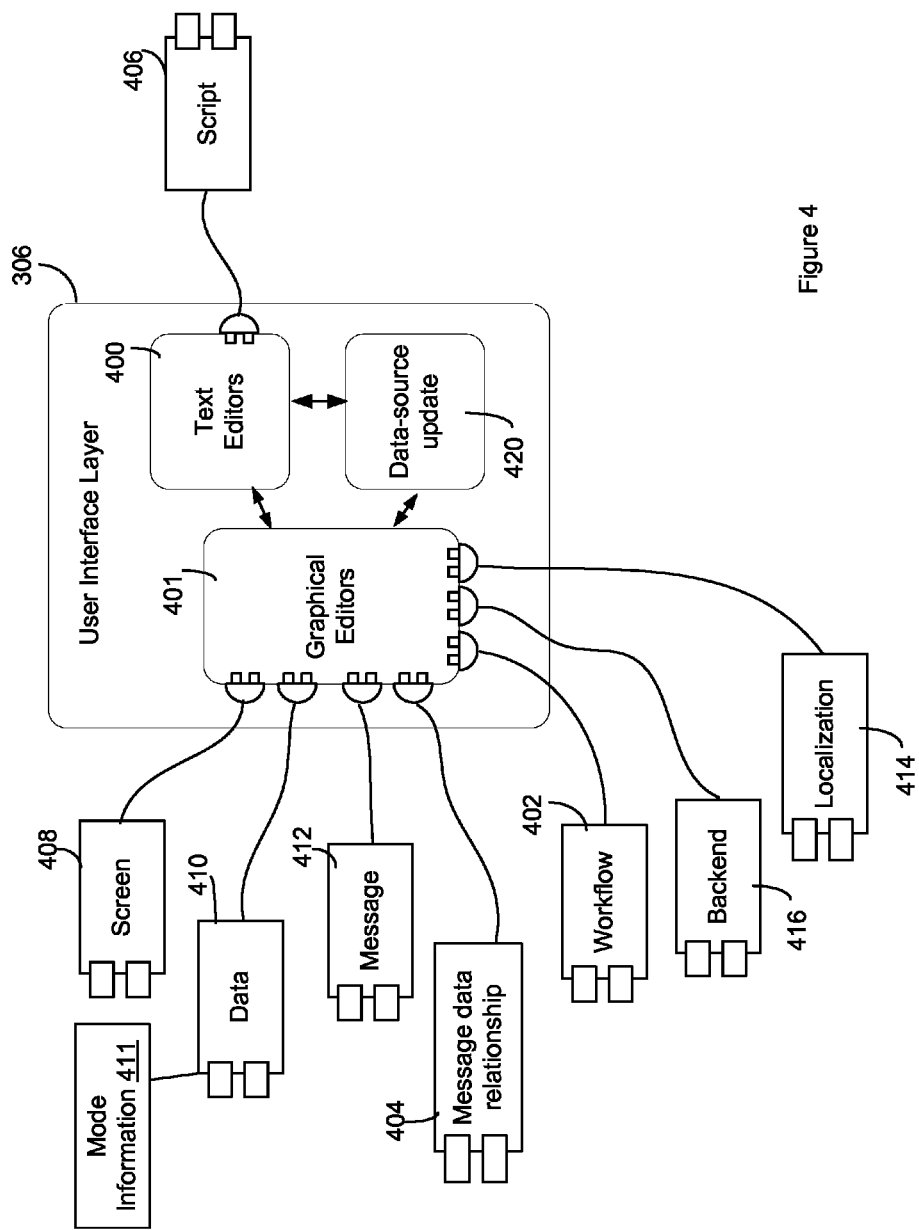
FIG. 4 is a block diagram illustrating design tool plug-ins.

Applications, such as application 210, may be programmed to take advantage of the multi-mode capabilities of the device 102. With reference to FIGS. 3 and 4, application development environment 107 may be configured to assist a programmer/developer to develop workflow behaviours 217, messages 211, data 213, screens 215, etc. that are responsive to mode information. Furthermore applications developed using application development environment 107 could be configured to support operation on both single-mode and multi-mode devices.

As noted with reference to FIG. 1, a programmer/developer's design tool is operated in an application development environment executing on a computer. The development methodology of the design tool can be based on a visual "drag and drop" system of building application models. The design tool can be structured as a set of plug-ins to a generic integrated design environment (IDE) framework, such as, for example, the Eclipse™ framework. Alternatively, the tool can be configured as a complete design framework without using a plug-in architecture. For exemplary purposes only, the tool will now be described as a plug-in design environment using the Eclipse™ framework.

Referring to FIG. 3, an overall designer tool structure for designing component applications is illustrated generally by numeral 200. In the present embodiment, the designer tool is implemented using Eclipse™. Eclipse™ is designed to support the construction of a variety of tools for application development. Further, Eclipse™ supports an unrestricted set of tool providers, including independent software vendors (ISVs) as well as tools for manipulating arbitrary content types (for example HTML, Java, C, JSP, EJB, XML, and GIF). Eclipse™ supports both GUI and non-GUI-based application development environments.

Eclipse™'s principal role is to provide tool providers with mechanisms to use and rules to follow that lead to seamlessly-integrated tools. These mechanisms are exposed via well-defined application program interface (API) interfaces, classes, and methods. Eclipse™ also provides useful building blocks and frameworks that facilitate developing new tools.

Eclipse™ comprises a plug-in architecture, wherein a plug-in is the smallest unit that can be developed and delivered separately. Usually a small tool is written as a single plug-in, whereas a complex tool has its functionality split across several plug-ins. Plug-ins are coded in Java and a typical plug-in consists of Java code in a Java Archive (JAR) library, some read-only files, and other resources such as images, Web templates, message catalogs, native code libraries, and the like.

Each plug-in has a manifest file declaring its interconnections to other plug-ins. In order to define interconnections a plug-in declares any number of named extension points, and any number of extensions to one or more extension points in other plug-ins. Eclipse™ is a well-known environment, and these and other features are thoroughly described at www.Eclipse.org.

In the present embodiment, Eclipse™ is used to enable a developer to design a component application. A component application is an application defined generally by a structured set of components, including data components, message components, presentation components and workflow components described above. The components are defined using a structured language and executed on a client device by an intelligent runtime container.

The designer tool 300 comprises a user interface (UI) layer 306, a model layer 312 and a service layer 314. The UI layer 306 primarily comprises a collection of user modules 301, including graphical and text editors, viewers and wizards. A large majority of external interactions are accomplished through one or more of these modules, with the developer using a system of drag and drop editing and wizard-driven interaction. A secondary, non-user-facing system interface is that of backend connector, whereby the designer tool 300 can communicate with various backend servers 108, such as Web Service providers and relational databases for example. As described above, designer the tool 300 can be built on the Eclipse™ platform. Accordingly, the user modules 301 are plug-in modules 301 that extend Eclipse™ classes and utilize the Eclipse™ framework.

The UI layer 306 has access to an extensive widget set and graphics library known as the Standard Widget Toolkit (SWT) for Eclipse™. Further, the user modules 301 can utilize a higher-level toolkit called JFace that contains standard viewer classes such as lists, trees and tables and an action framework used to add commands to menus and toolbars. The designer tool 300 can also use a Graphical Editing Framework (GEF) to implement diagramming editors. The user modules 301 typically follow the Model-View-Controller design pattern where each user module 301 is both a view and a controller.

The model layer 312 includes a design-time model 308 and a runtime model 310 and represent the persistent state of the application. The separation of the layers UI layer 306 and the model layer 312 keeps presentation specific information in various views and allows multiple user modules 301 to respond to data model changes.

In the present embodiment, the data models 308,310 are based on the Eclipse™ Modeling Framework (EMF). EMF is a framework and code generation facility. The framework provides model change notification, persistence support and an efficient API for manipulating EMF objects generically. A code generation facility is used to generate the model implementation and create adapters to connect the model layer 312 with the UI layer 306.

The service layer 314 provides services for the UI layer 306 such as a validation service, localization service, generator service, build service, and deployment service.

The localization service is responsible for supporting a build-time localization of user visible strings, supporting additional localization settings (such as default time and date display format, default number display format, display currency format, and the like), and creating resource bundle files (in a JAR file) that can be used during preparation of the deployable application. For example, the localization service can be implemented as a resource module for collecting resources that are resident in the design-time model 308 for inclusion in the deployable application. The JAR file can be a file that contains the class, image, and sound files for the application gathered into a single file and compressed for efficient downloading to the wireless device.

The generator service uses the localization service to produce customized resource bundles, such as language-specific bundles, for example. The build service implements preparation of the resource bundles and packaging of them with the deployable application. The localization service interacts with the tool editors and viewers for setting or otherwise manipulating language strings and local settings of the application.

The generator service generates application XML from the defined components, generates a mapping document, optimizes field ordering of the component descriptors, and generates dependencies and script transformation as required. In order to achieve this, the generator service collaborates with the design-time model 308 to obtain the content of the developed components that comprise the application. The generator service uses the validation service to check that both the application definitions and the mapping document are viable.

The generator service then produces the application XML, with inclusions and/or augmentations of the script of the workflow components and the mapping documents from relationships held in the design-time model 308. The generator service uses the localization service to produce the language resource bundles via a resource bundle interface.

The designer tool 300 uses Eclipse™ extension points to load additional plug-ins for two types of services: backend connectors 316 and device skins 318. The backend connectors 316 define extension points for facilitating communication with different backend servers 108. The device skin 318 defines an extension point for allowing the designer tool 300 to emulate different devices 102.

The backend connectors 316 are responsible for connecting to a selected one (or more) of the backend servers, providing an interface for accessing a description of the backend data source, and/or providing for the identification of Notification services, which push notifications to the wireless device 102. The backend connector 316 provides an interface to the backend server 108 for access of the data source description, and can provide a level of abstraction between implementation specific details of the backend messaging and generic messaging descriptions maintained by the design-time model 308. For example, the backend connector 316 is used to generate appropriate messaging and data component sets for the application, and is used by a model validator to verify the validity of existing message mapping relationships in the application under development. For example, the backend connector 316 can be implemented as an interface using an API call as the protocol to access the underlying backend data source 108, for example using a Web Service Definition Language (WSDL) Interface for Web Services.

The UI Layer 306 uses a Model-View-Controller (MVC) pattern where each user module 301 can be both a viewer and a controller. As controllers, user modules 301 interact with the model layer 312 models with some related control logic as defined by the MVC pattern. In the present embodiment, both editors and viewers are examples of user modules 301 that commit changes to the models immediately upon implementation. Wizards are user modules 301 that are step-driven by a series of one or more dialog interfaces, wherein each dialog interface gathers specific information from a user of the design tool 300. Wizards 304 apply no changes to the models until confirmation is received, such as selecting a finish button.

As viewers, the user modules 301 are observers of the models and are used to interact or otherwise test and modify the models of the application. When the model data changes, the models are notified and respond by updating the presentation of the application. The design-time model 308 is the current version of the application in development and is accessed by users employing the user modules 301 to interact with the associated data of the design-time model 308. Modules 301 can also trigger validation actions on the design-time model 308. User modules 301 can also cause some or all of the application to be generated from the design-time model 308. In general, the design-time model 308 accepts a set of commands that affects the state of the model 308, and in response may generate a set of events. Each user module 301 includes the set of commands and the events that affect the module 301 and data model 308 pairing.

The design-time model 308 represents the state of an application development project and interacts with the user modules 301 by notifying user modules 301 when the state of the design-time model 308 has changed. The design-time model's 308 primary responsibility is to define an application, and, accordingly, may include: data component definitions; global variable definitions; message component definitions; resource definitions; screen component definitions; scripts; style definitions. The design-time model 308 responds to commands of each editor and/or viewer. The design-time model 308 also sends events to user modules 301 in response to changes in the design-time model 308, as well as communicating with the other modules 301 when the design-time model 308 has changed.

Referring to FIG. 4, the distribution of user modules 301 as Eclipse™ plug-ins is shown. User modules 301 fall broadly into two categories: Text Editors 400, which implement standard line-based editing functionality; and Graphical Editing Framework (GEF) Editors 401, which provide an edit space in which to draw objects. A GEF Editor 401 in the context of the design tool 300 can contain a palette and a canvas, as is known in the art. The user can drop nodes (entities) from the palette onto the canvas and add connections to define relationships therebetween, so as to define the content and interrelationships of the components of the application. It will be recognized that the user modules 301 are used to create and modify definitions contained in the components as well as to create and modify the interdependencies therebetween. Further, it will be recognized that the user modules 301 can be a combination of text-based and/or graphical-based modules 301, as desired.

User Modules

As previously described, the user modules 301 are not directly aware of the design-time model 308. Generally, the user module 301 creates a command to change the design-time model 308 so that the change can be undone through an undo API (not shown). The user module 301 can be configured with an EMF core object called an editing domain that maintains a command stack. The editing domain uses the adapter factory to find an adapter that can create the command. The generated adapter class (ItemProvider) creates the command. The user module 301 executes the command by using the command stack. Further, because the ItemProvider is a notification observer, it is notified when the design-time model 308 changes. The ItemProvider in turn notifies a corresponding provider. The provider instructs the user module 301 to refresh after a change notification.

Script Editor

The script editor 406 is a constrained text editor for providing relationships between application components. Typically, this information is provided as part of the workflow component. Some commands, such as creating functions, can be restricted such that they are not user-definable in the component application. Accordingly, when a function is created, the events generated by the script editor 406 are fixed. Other commands, such as SavesSript for example, may be edited by the script editor 406. SaveScript is used when the user saves a script of the application. In the present embodiment, SaveScript triggers the design-time model 308 events NavigationChanged, LocalizedStringChanged and ExitCodeChanged, if successful.

Further, the script editor 406 can react to events. For example, ComponentRemoved indicates whether a removed component affects input parameters to the script or globals used by the script. If the removed component affects the script, the script editor 406 prompts the user of the design tool 300 that the script is invalid.

A sample interface of the script editor extends the org.Eclipse.ui.editors extension point of the Eclipse™ framework by implementing a subclass of the org.Eclipse.ui.editors.texteditors hierarchy. The design tool 300 coordinated the creation and/or modification of scripts in the components as well as the inter-relation of the script affecting other associated components of the application.

Screen Editor

The screen editor 408 facilitates creation and modification of the structured definition language code in the screen components associated with display of data on the device 102. UI controls for inclusion in the screen components can be dropped onto a form canvas in the editor. Control properties, including event handlers, can be edited by the screen editor 408.

Sample commands that can be edited by the screen editor 408 include the following commands. ButtonChange is sent to the design-time model 308 when the developer changes a button control. This command triggers NavigationControlChanged of the design-time model 308 if successful. MenuItemChange is sent when the developer changes a menu item. This command triggers NavigationControlChanged of the design-time model 308 if successful. ChangeScript is sent when the developer changes a script. This command triggers NavigationControlChanged of the design-time model 308 if successful. QueryMessages is sent when the developer needs a list of available messages that the screen of the application may send or refresh, and returns a list of available messages. QueryData is sent when the developer needs a list of available data objects to bind controls to and returns a list of available data. NonNavigationControlChange is sent when a control that does not affect navigation has been modified. DataBindingChange is sent when a data binding has changed. This command triggers DataBindingChanged and ScreenParameterListChanged of the data model 308 if successful.

Sample input events to the screen editor 408 include the following. An event ComponentRemoved informs the screen editor that a component to which a screen component refers has been removed. An event ComponentRenamed is similar to ComponentRemoved. An event ScreenParameterListChanged modifies the screen component if a parameter used has been modified. The screen component either adjusts that parameter or warns the developer that those dependencies are no longer valid and must be changed. An event MessageFieldChanged checks to see if a field in question is used by the screen component. An event DataFieldChanged checks to see if any controls bound to the field(s) have changed and warns the developer accordingly.

A sample interface of the screen editor 408 extends org.Eclipse.ui.editors of the Eclipse framework using the GEF GraphicalEditor and/or a VE editor. The design tool 300 coordinates the creation and/or modification of screen definitions in the screen components as well as the inter-relation of the screen definitions affecting other associated components of the application.

Thus in accordance with programmer/developer preferences, screen components may be created to account for different mode information such as alternative screens that are chosen at runtime depending on the current mode of communication.

Data Editor

The data editor 410 facilitates creation and modification of the structured definition language code in the data components of the application by providing the developer the ability to edit data component fields and properties. New data objects can be created from scratch, by prototyping existing data objects or based on data definition mappings to message objects in message components. Predefined or built-in data components may be provided by the tool 200. For example, a built in data component 411 may be provided for mode information. This data component 411 may be used to provide mode information 209 to application 210. Workflow 217 may be defined (e.g. as described below) to be responsive to the mode information and changes to it. For example, mode information comprising delivery failure notification may be used by workflow to trigger fail over action (e.g. to resend to enable use of a different delivery mode) or to prompt a user to specify an action.

Sample commands editable by the data editor 410 include the following. AddRemoveFields is sent when the developer adds or removes a field from a data object definition. This command triggers DataFieldChanged of the data model 308 if successful. LinkToExternalData is sent when the developer links a data object definition to an external data object, such as a Calendar or Contacts data object for example. This command triggers DataFieldChanged of the data model 308 if successful.

A sample input events to the data editor 410 includes an event ComponentRemoved, which checks to see if a removed object was related to a message through prototyping or containment. The developer can then adjust the fields contained in the data object affected. An event ComponentRenamed is similar to ComponentRemoved.

A sample interface of the screen editor 408 extends org.Eclipse.ui.editors using the GEF GraphicalEditor. The design tool 300 coordinates the creation and/or modification of data definitions in the data components as well as the inter-relation of the data definitions and associated screen/message definitions affecting other associated components of the application.

Message Editor

The message editor 412 facilitates creation and modification of the structured definition language code in the message components of the application. The message designer allows a developer to create and edit messages components for sending messages to and receiving messages from backend servers 108. These messages can include both request/response pairs as well as subscribe/notify/unsubscribe notification messages. Message definitions can be created by prototyping existing messages or by templates based on backend services of the backend servers 108.

Further, the message editor provides the ability to define message properties such as by defining a delivery mode 246 or a reliability level for the message. As previously described, the reliability level defines how the message is to be handled at the device 102 and the application gateway 106, including delivery, acknowledgement and persistence. The message reliability can be set by an appropriate UI input mechanism such as a drop down menu or radio button selection. The message reliability can be set on a per message or per application level. Similarly, the delivery mode may be indicated such as with radio buttons or selections. Priorities may be assigned to the delivery mode. At runtime, the MDS runtime environment 202 providing message support can handle the message in accordance with the message's properties and the information determined from the communications interface mobile device 212.

Sample commands that can be edited by the message editor 412 include AddRemoveFields, which is sent when a field is added to or remove from a message in a message component.

Sample input events to the message editor 412 include the following. An event ComponentRemoved checks to see if a component that referenced the message definition has been removed. An event ComponentRenamed is similar to ComponentRemoved. An event FieldMappingChanged checks to see if a field mapping effects the message definitions being edited.

A sample interface of the screen editor 408 extends org.Eclipse.ui.editors using the GEF GraphicalEditor. The tool design 300 coordinates the creation and/or modification of message definitions in the message components as well as the inter-relation of the created/modified message affecting other associated components of the application.

Workflow Editor

The workflow editor 402 facilitates creating and modifying the command code in the workflow components of the application. The workflow editor 402 defines the screen-to-screen transitions that form the core of the visual part of the component application. Screens and transitions between screens due to user/script events are rendered visually.

Workflow 217 may be defined that is responsive to mode information 209 to vary certain behaviours (e.g. UI screens used) for the application. For example, on determining delivery failure for a particular message, workflow may coordinate a pop-up or other screen to notify a user and provide an interface to request a resend. By way of a further example, different user action choices can be made available in response to the mode information. When a low cost mode of communication is available, workflow can make certain UI elements available to initiate actions that may not be desired if only high cost modes are available. Alternatively, workflow could make the action available but queue the message until a low cost mode is available or advise the user that continuing will result in communication using a host cost mode, giving the user an option to cancel invocation.

Sample commands that can be edited by the workflow editor 402 include the following. QueryScreens is sent when the developer wants a list of screens to select from, such as when adding a new screen to the workflow. QueryScripts is sent when the developer wants a list of scripts to call on a screen navigation event. QueryArrivingMessages is sent when the developer wants a list of response messages (including notifications) on which to key screen transitions. AddComponent is sent when the developer wants to add a new screen, message or script to the workflow that doesn't already exist in the workflow. This command triggers ComponentAdded of the data model 308 if successful. ChangeNavigation is sent when the developer adds a new navigation node to the workflow. This command triggers NavigationChanged of the design-time model 308 if successful.

Sample input events to the workflow editor 402 include the following. An event ComponentRemoved checks to see if a removed component is a workflow object. The Workflow updates itself by deleting all relationships with this object definition. An event ComponentRenamed checks to see if a renamed component is a workflow object. The workflow updates its visual with the new name of the component. An event NavigationControlChanged checks to see if the workflow needs to update its view of the navigation based on a control change. If, for example, a button has been added to a screen in the workflow, then the view is updated to show the availability of a new navigation node on that screen. An event ScreenParameterListChanged checks to see if a screen's parameter list has changed and if the screen is in the workflow. The view of any navigation involving that screen is updated. An event NavigationChanged checks to see if a possible navigation change has occurred. The change is parsed and any necessary updates are made to the view. An event ExitCodeChanged checks to see if an exit point has been added/removed. The editor view is updated to reflect this visually.

A sample interface of the screen editor 408 extends org.Eclipse.ui.editors using the GEF GraphicalEditor.

Message-Data Relationship Editor

The message-data relationship editor 404 facilitates creating and modifying the structured definition language code in the inter-related message and data components of the application. The message/data relationship editor creates and edits relationships between message components and data components. These mappings effect how a data component is populated on message arrival at the device 102 when running the application. For example, data object definitions common between data and message components can exist such that the data object definitions are resident in the data component, while a data mapping definition links the message component to the data object definition in the data component is resident in the message component, or vice versa. A similar configuration can be employed for data object definitions common between screen and data components, whereby the data object definition is resident in one of the components and the data mapping definition is resident in the other associated component.

Sample commands that can be edited by the editor 404 include the following. AddComponent is sent when a new data or message is added to the relationship diagram with the effect of also adding that component to the application being developed. This command triggers ComponentAdded of the design-time model 308 if successful. QueryMessages is sent when the developer needs a list of Messages to map. QueryData is sent when the developer needs a list of Data to map. ChangeMessageLevelMapping is sent when the developer changes a message-level mapping. This command triggers FieldMappingChanged of the data model 308 if successful. ChangeFieldLevelMapping is sent when the developer changes a field-level mapping. This command triggers FieldMappingChanged of the data model 308 if successful. ChangePrototype is sent when the developer changes a prototype relationship between data objects. This command triggers FieldMappingChanged of the data model 308 if successful. ChangeContainment is sent when the developer changes a containment relationship between data objects. This command triggers MessageContainmentChanged of the data model 308 if successful.

Sample input events to the editor 404 include the following. An event ComponentRemoved checks to see if the object removed was a message or data. The relationship mapper deletes any relationships involving the removed object. An event ComponentRenamed checks to see if the renamed object is involved in any mapping relationships. The visual representation of the mapped object is updated with the new name. An event MessageFieldChanged checks to see if the message involved is present in the relationship editor. The field change is then reflected in the visual representation of the message. If the field in question is involved in a mapping, then changes are reflected and the developer may need to be warned of broken mappings if applicable. An event DataFieldChanged is similar to MessageFieldChanged except using data instead of messages.

A sample interface of the editor 404 extends org.Eclipse.ui.editors using the GEF GraphicalEditor. The design tool 300 coordinates the creation and/or modification of message/data definitions in the message/data components as well as the inter-relation of the created/modified message/data definitions affecting other associated components of the application.

Localization Editor

The localization editor 414 allows the developer to collect all strings that will be visible to the application end-user (of the device 100) and edit them in one place. The editor 414 also allows the developer to create multiple resource mappings for each string into different languages. A sample command that can be edited by the editor 414 includes ChangeLocalizeString, which is sent when the developer adds, deletes or modifies a localized string. A sample input event to the editor 414 includes an event LocalizedStringChanged, which is used to determine when a string literal has been changed in the script editor or a label has changed in the screen editor 408. The localization editor 414 can extend the org.Eclipse.ui.editors interface by extending an EditorPart.

Backend Visualizer Editor

The backend visualizer editor 416 shows the developer the relationships between message components and the backend servers that drive the components. The backend visualizer editor 416 also allows the developer to add new backend servers to the list of those supported by the application in development. In addition to interaction with the design-time data model 308, as is described for other modules 301 using commands and events received, the backend visualizer editor 416 collaborates with the backend connector. The backend connector 316 allows the visualizer to request a ServicesInterface from a registry of known service types. A list of services of this type is returned that can queried by name or by iteration.

Sample commands that can be edited by the editor 416 include the following. AddComponent is sent when the developer adds a new message. This command triggers ComponentAdded of the data model 308 if successful. SpecifyMapping is sent when the developer connects a message to a selected backend server 108.

Sample input events to the editor 416 include the following. An event ComponentRemoved checks to see if the component is a message. The backend visualizer adjusts its mappings for that message. An event ComponentRenamed is similar to ComponentRemoved. An event MessageFieldChanged validates the message field against what exists on the backend server 108 and notifies the developer visually of any broken mappings. Backend servers 108 are accessed through direct calls to the service layers. Optionally, background processing may be used to keep network processing from blocking UI threads. The Editor 416 can extend the org.Eclipse.ui.editors using the GEF GraphicalEditor.

Build Service

The design tool 300 further comprises a build service for building a deployable form of the application and generates the deployable application bundle file in a JAR format, for example. The build service receives/retrieves application elements such as available application XML, mapping documents, resource bundles and resources as described above. These application elements are provided via the design tool 300 by the generator service. The build service comprises a build engine for generating the deployable application bundle. The application bundle is made available to a deployment service.

It is recognized that build service can be packaged either as part of the application development environment 107 or separately therefrom. The latter case would enable a developer to bypass using the design tool 300 to develop the component application. The developer could, therefore, still have access to the build service via an external interface for building the application bundle.

Deployment Service

The deployment service connects to the repository 124 to deposit and/or publish a generated deployment descriptor for a given application. The deployment service also provides the available application JAR file at deployment time. Although the deployment service does not install the application JAR file, the deployment service inspects the JAR file to determine what localized components, such as which languages are supported, for example. This information can be added to the descriptor file. Similar to the build service, the deployment service can be packaged either as part of the application development environment 107 or separately therefrom.

Data Source Update Module

The user interface layer 306 may further include a data-source (DS) update module 420. The DS update module 420 is a mechanism by which an existing component-based application allows conditional and partial reuse of its current component structure by adapting the component-based application and its corresponding mapping document to a new data-source description document. In the present embodiment, the mapping document is an XML document that maps parts and elements in an application to corresponding parts and elements in the DS description document, which is defined in WSDL.

The DS update module 420 provides the ability to re-discover the DS description document by re-pointing to its old location or pointing to a new location. If the DS description document has changed, the DS update module 420 analyzes for the change and can automatically update the component application definitions for the change, under programmer control as desired.

Figure 5:
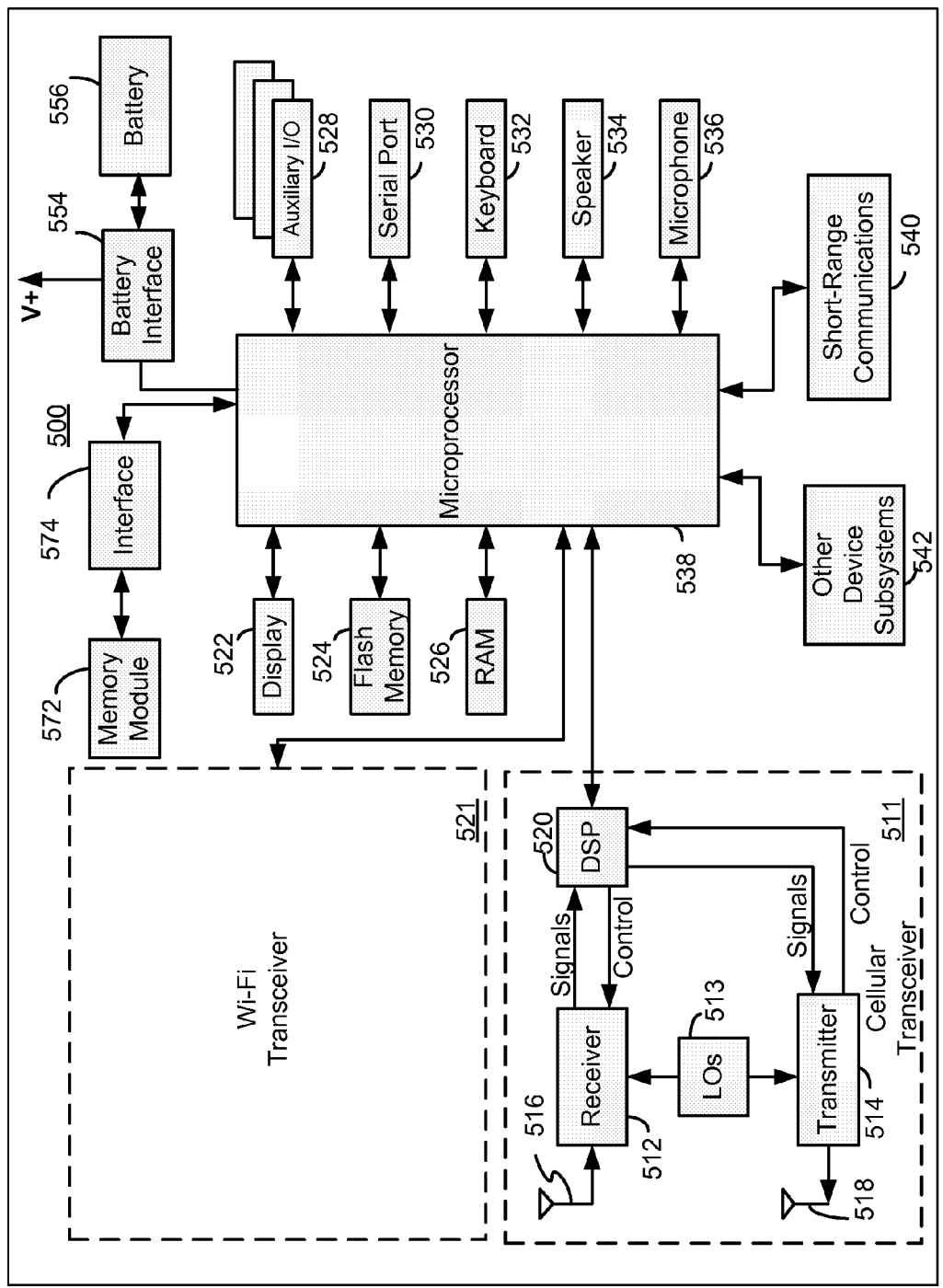
FIG. 5 is a block diagram of a representative mobile device that may be configured with multi-mode applications as described.

FIG. 5 is a detailed block diagram of an embodiment of a handheld wireless communication device 500 that may be configured as a mobile device 102 as described. Handheld device 500 is preferably a two-way communication device having at least voice and advanced data communication capabilities, including the capability to communicate with other computer systems. Depending on the functionality provided by handheld device 500, it may be referred to as a data messaging device, a two-way pager, a cellular telephone with data messaging capabilities, a wireless Internet appliance, or a data communication device (with or without telephony capabilities). In the present embodiment, handheld device 500 has both Wi-Fi transceiver and cellular transceiver capabilities. As such device 500 may communicate in respect modes with any one of a plurality of access points and base station transceiver systems (not shown) within its geographic coverage area.

Handheld device 500 may incorporate a cellular transceiver (communication subsystem) 511, which includes a receiver 512, a transmitter 514, and associated components, such as one or more (preferably embedded or internal) antenna elements 516 and 518, local oscillators (LOs) 513, and a processing module such as a digital signal processor (DSP) 520. As will be apparent to those skilled in field of communications, particular design of communication subsystem 511 depends on the communication network in which handheld device 500 is intended to operate.

Handheld device 500 may send and receive communication signals over the network after required network registration or activation procedures have been completed. Signals received by antenna 516 through the network are input to receiver 512, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 520. In a similar manner, signals to be transmitted are processed, including modulation and encoding, for example, by DSP 520. These DSP-processed signals are input to transmitter 514 for digital-to-analog (D/A) conversion, frequency up conversion, filtering, amplification and transmission over communication network via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Network access is associated with a subscriber or user of handheld device 500, and therefore handheld device 500 comprises a memory module 572, memory module card or a Removable User Identity Module (R-UIM), to be inserted in or connected to an interface 574 in order to operate in the network. Alternatively, memory module 572 may be a non-volatile memory that is programmed with configuration data by a service provider so that mobile station 500 may operate in the network. Since handheld device 500 is a mobile battery-powered device, it also includes a battery interface 554 for receiving one or more rechargeable batteries 556. Such a battery 556 provides electrical power to most if not all electrical circuitry in handheld device 500, and battery interface 554 provides for a mechanical and electrical connection for it. The battery interface 554 is coupled to a regulator (not shown in FIG. 5) that provides power V+ to all of the circuitry.

Handheld device 500 may include a Wi-Fi transceiver 521 that may comprise similar components/chipsets to subsystem 511 adapted for one or more Wi-Fi protocols.

Handheld device 500 includes a microprocessor 538 that controls overall operation of mobile station 500. Communication functions, including at least data and voice communications, are performed through communication subsystem 511. Microprocessor 538 also interacts with additional device subsystems such as a display 522, a flash memory 524, a random access memory (RAM) 526, auxiliary input/output (I/O) subsystems 528, a serial port 530, a keyboard 532, a speaker 534, a microphone 536, a short-range communications subsystem 540, and any other device subsystems generally designated at 542. Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list. Operating system software used by microprocessor 538 is preferably stored in a persistent store such as flash memory 524, which may alternatively be a read-only memory (ROM) or similar storage element (not shown). Those skilled in the art will appreciate that the operating system, specific device applications e.g. the runtime 202 and device "component" applications 210, or parts thereof, may be temporarily loaded into a volatile store such as RAM 526.

Microprocessor 538, in addition to its operating system functions, preferably enables execution of software applications on handheld device 500. A predetermined set of applications that control basic device operations, including at least data and voice communication applications, will normally be installed on handheld device 500 during its manufacture. A preferred application that may be loaded onto handheld device 500 may be a personal information manager (PIM) application having the ability to organize and manage data items relating to a user such as, but not limited to, e-mail, calendar events, voice mails, appointments, and task items. Naturally, one or more memory stores are available on handheld device 500 and memory module 572 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on handheld device 500 with respect to such items. This is especially advantageous where the host computer system is the mobile station user's office or enterprise computer system. Additional applications may also be loaded onto handheld device 500 through network, an auxiliary I/O subsystem 528, serial port 530, short-range communications subsystem 540, or any other suitable subsystem 542, and installed by a user in RAM 526 or preferably a non-volatile store (not shown) for execution by microprocessor 538. Such flexibility in application installation increases the functionality of handheld device 500 and may provide enhanced on-device functions, communication-related functions, or both. For example, secure communication applications may enable electronic commerce functions and other such financial transactions to be performed using handheld device 500.

In a data communication mode, a received signal such as a text message, an e-mail message, or web page download, or message according to an application 210 will be processed by applicable communication subsystem 511 or 521 and input to microprocessor 538. Microprocessor 538 will preferably further process the signal, in accordance with an associated application, for output to display 522 or alternatively to auxiliary I/O device 528. A user of handheld device 500 may also compose data items in accordance with an associated application, such as e-mail messages, for example, using keyboard 532 in conjunction with display 522 and possibly auxiliary I/O device 528. Keyboard 532 is preferably a complete alphanumeric keyboard and/or telephone-type keypad. These composed items may be transmitted over a communication network through communication subsystem 511 or 521.

For voice communications, the overall operation of handheld device 500 is substantially similar, except that the received signals would be output to speaker 534 and signals for transmission would be generated by microphone 536. Alternative voice or audio I/O subsystems, such as a voice message recording subsystem, may also be implemented. Although voice or audio signal output is preferably accomplished primarily through speaker 534, display 522 may also be used to provide an indication of the identity of a calling party, duration of a voice call, or other voice call related information, as some examples.

Serial port 530 in FIG. 5 is normally implemented in a personal digital assistant (PDA)-type communication device for which synchronization with a user's desktop computer as a desirable, albeit optional, component. Serial port 530 enables a user to set preferences through an external device or software application and extends the capabilities of handheld device 500 by providing for information or software downloads to handheld device 500 other than through a wireless communication network. The alternate download path may, for example, be used to load an encryption key onto handheld device 500 through a direct and thus reliable and trusted connection to thereby provide secure device communication. As well, it may be used as describe above as a delivery mode for applications 210.

Short-range communications subsystem 540 is an additional optional component that provides for communication between handheld device 500 and different systems or devices, which need not necessarily be similar devices. For example, subsystem 540 may include an infrared device and associated circuits and components, or a Bluetooth™ communication module to provide for communication with similarly enabled systems and devices. Bluetooth™ may be used as describe above as a delivery mode for applications 210.

Though described primarily in association with wireless mode operations, persons of ordinary skill in the art will appreciate that devices 102 may be configured for multi-mode operation selecting among different wireless modes and wired modes with suitable changes to the network infrastructure. Applications 210 may be configured for operations in accordance with multiple wireless modes, wired modes and both wireless and wired modes. Operations may be configured to select different modes of a same type as well. For example, to choose among available Wi-Fi networks or available cellular networks from different cellular service providers.

Although specific embodiments of the invention have been described herein, it will be understood by those skilled in the art that variations may be made thereto without departing from the spirit of the invention or the scope of the appended claims.

I claim:

1. A non-transitory computer readable medium comprising instructions which when executed by a processor of a computer system cause the system to provide an application design tool for programming applications for execution by a multi-mode communication device configured to communicate using two or more communication modes, each of the two or more communication modes comprising a respective wireless and/or wired network, the instructions comprising:
   a message definition module configured to:
      define messages of a specific application for communicating by the multi-mode communication device when executing the specific application the messages comprising a first data message to be communicated to receive first services from a remote server and a second data message to be communicated to receive second services from the remote server, and
      specify message delivery properties for each of the respective messages including a list of at least one communication mode by which to communicate the respective messages at runtime;
      wherein a first list comprising two or more communication modes is specified for the first data message to enable choice of communication mode at runtime and a second list comprising a single communication mode is specified for the second message to restrict communication of the second message by only the single communication mode.

2. The non-transitory computer readable medium of claim 1 wherein the instructions define the application design tool to comprise a data definition module for defining data to be used by the component applications, said data definition module configured to provide a pre-defined data definition for determining mode information about the modes of communication at runtime.

3. The non-transitory computer readable medium of claim 2 wherein the multi-mode communication device comprises a runtime environment for the component applications which environment generates the mode information from communication characteristics available at runtime.

4. The non-transitory computer readable medium of claim 1 wherein the instructions define the application design tool to comprise a workflow definition module for programming operations of the component application at runtime, and wherein the workflow definition module is configured to permit a developer to vary the operations of the component application in response to the mode information.

5. The non-transitory computer readable medium of claim 1 wherein a first of the two or more communication modes operates in accordance with a mobile telephone standard and a second of the two or more communication modes operates in accordance with a wireless LAN (wLAN) standard.

6. The non-transitory computer readable medium of claim 1 wherein the component application is defined by respective components for messages, data, workflow and user interface operations and wherein a runtime environment provides support for generating, hosting and executing the component application on the multi-mode communication device.

7. A computer system comprising a processor and a non-transitory computer readable medium configured to provide an application design tool in accordance with claim 1.

8. The computer system in accordance with claim 7 the instructions define the application design tool to comprise a data definition module for defining data to be used by the component applications, said data definition module configured to provide a pre-defined data definition for determining mode information about the modes of information at runtime.

9. The computer system in accordance with claim 8 wherein the multi-mode communication device comprises a runtime environment for the component applications which environment generates the mode information from communication characteristics available at runtime.

10. The computer system in accordance with claim 9 wherein the instructions define the application design tool to comprise a workflow definition module for programming operations of the component application at runtime, and wherein the workflow definition module is configured to permit a developer to vary the operations of the component application in response to the mode information.

11. The computer system in accordance with claim 7 wherein the component application is defined by respective components for messages, data, workflow and user interface operations and wherein a runtime environment provides support for generating, hosting and executing the component application on the multi-mode communication device.

12. The computer system in accordance with claim 7 wherein a first of the two or more communication modes operates in accordance with a mobile telephone standard and a second of the two or more communication modes operates in accordance with a wireless LAN (wLAN) standard.

13. A method of configuring a multi-mode communication device to communicate using two or more communication modes, each of the two or more communication modes comprising a respective wireless and/or wired network, the method comprising:

defining a component application including at least a message component to be generated, hosted and executed by a runtime environment of the communication device, the message component including message definitions for respective messages to be communicated by the communication device at runtime, the respective message definitions specifying delivery properties including a list of at least one communication mode by which to communicate the respective messages at runtime;

wherein a first data message is defined to be communicated to receive first services from a remote server and a second data message is defined to be communicated to receive second services from the remote server; and wherein a first list comprising two or more communication modes is specified for the first data message to enable choice of communication mode at runtime and a second list comprising a single communication mode is specified for the second message to restrict communication of the second message by only the single communication mode.

14. The method of claim 13 defining data to be used by the component applications using a pre-defined data definition for determining mode information about the modes of information at runtime.

15. The method of claim 14 wherein the multi-mode communication device comprises a runtime environment for the component applications which environment generates the mode information from communication characteristics available at runtime.

16. The method of claim 13 comprising defining workflow operations of the component application where the operations of the component application are responsive to the mode information at runtime.

17. The method of claim 13 wherein a first of the two or more communication modes operates in accordance with a mobile telephone standard and a second of the two or more communication modes operates in accordance with a wireless LAN (wLAN) standard.

18. The method of claim 13 wherein the component application is defined by respective components for messages, data, workflow and user interface operations and wherein a runtime environment provides support for generating, hosting and executing the component application on the multi-mode communication device.

* * * * *